Oct. 23, 1928.
W. DUBILIER
1,688,960
ELECTRICAL CONDENSER
Filed Nov. 30, 1925
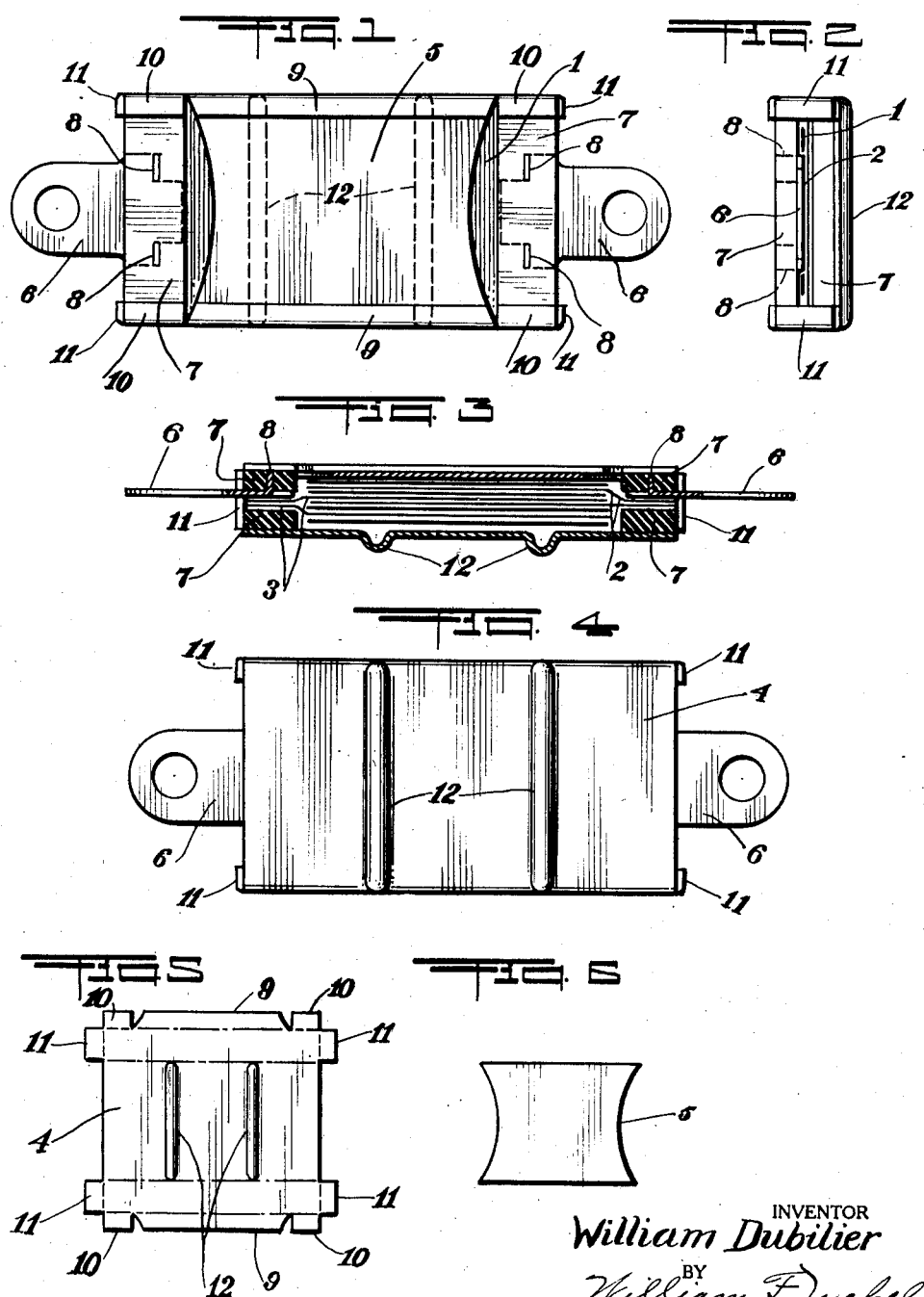
INVENTOR
William Dubilier
BY
ATTORNEY Patented Oct. 23, 1928.

1,688,960

UNITED STATES PATENT OFFICE.

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE.

ELECTRICAL CONDENSER.

Application filed November 30, 1925. Serial No. 72,300.

My invention relates to improvements in electrical condensers; especially condensers of constant capacity, enclosed in a suitable protective cover or sheathing.

An object of this invention is to provide a condenser which comprises electrically conductive elements separated by intervening dielectric, securely clamped together in a casing which envelops the elements, holds them in proper relation, and at the same time stiffens and strengthens the entire construction, so that the condenser can conveniently be connected in circuit and subjected to much handling without impairment or deterioration from use.

Other objects and advantages of the invention are set forth in the following description, and the novel features of the invention are pointed out in the appended claims. But the drawings show only the best form of the invention now known to me and I reserve the right to vary the shape, size and arrangement of the parts and similar structural details, within the scope and spirit of the invention as the same is defined by the broad and general meanings of the terms in which the claims are expressed.

On the drawings,

Figure 1 is a top plan of a condenser in accordance with my invention;

Figure 2 is an end view thereof;

Figure 3 is a longitudinal section of same;

Figure 4 a bottom plan; and

Figures 5 and 6 are plan views of two blanks or plates which are combined and bent into proper engagement with the body of the condenser, and with each other to constitute the outside protective casing for same.

The same numerals identify the same parts throughout.

As shown in the drawings, the condenser comprises a stack or body including sheets of mica or other dielectric 1, interleaved with electrically conductive elements 2 and 3 of opposite polarity, and consisting preferably of metal foil. The elements 2 project from one end of the body or stack, and the elements 3 at the other. This body is covered by a clamping casing which may be subjected to pressure after being put on to engage the body securely and force the sheets of mica and metal foil into firm contact over substantially their entire area. On each end of the condenser is a terminal 6, one of which makes contact with the projecting portions of the elements 2 and the other with the projecting portions of the elements 3.

For the purpose of mounting the terminals 6 in the condenser, I make use of a pair of members or pieces of insulation 7, such as bakelite, and each terminal 6 is stamped or cut to provide projections 8 which enter recesses in one of the members 7, so that this member 7 and the terminal can be secured firmly together. The two members 7 at each end of the condenser are disposed with the projecting ends of the foils between them, and in contact with the terminals 6, and when the two members 7 which extend across each end of the condenser and are engaged so as to be caused to grip the projecting parts of the elements 2 and 3 between them, a very efficient contact between the sheets of foil of opposite polarity and the two terminals 6 will result.

The casing or covering of the condenser not only encloses the body containing the sheets of metal foil and mica, but it also is designed to grip the opposite ends of the members 7 and hold them in place against the two ends of the body and thus maintain connection between the metal foils and the terminals.

This casing comprises a plate or cover 4 and a plate 5, the former extending over one face of the body of the condenser and the area of the adjacent members 7 at the two ends thereof, and having portions at its opposite ends bent up against the sides of the body and the ends of the members 7, and its opposite edges 9 at the ends turned down towards the other face of the body of the condenser. Upon the other face is laid a plate 5, the ends of which are engaged by the turned over ends 9 of the plate 4 and so gripped by these turned over ends that it is held securely in place and both the opposite faces and the sides of the body of the condenser are entirely housed. This plate 5 has its two sides concave, presenting these concave edges to the two adjacent members 7.

At the ends, the plate 4 is also provided with longitudinal projections 10 and lateral projections 11. These longitudinal projections are bent over upon the opposite ends of the two members 7 which carry the terminals 6, and the projections 11 are bent around the ends of the condenser into contact with the side edges of the members 11 at the ends of the condenser. Thus the projections 10 and 11 grip the members 7 and cause them to press the terminals 6 and the projecting parts of the sheets of metal foil between them; keeping the two members 7 at each end of the condenser in place and preventing the terminals 6 from losing contact with the foils 2 and 3. Ribs 12 may be stamped in the plate 4 to extend cross-wise of the condenser, when the two plates 4 and 5 are put on the body thereof and bent to make the complete casing.

This design of condenser gives a very strong construction, and securely houses the body of the condenser, while at the same time, affording efficient contact inside of the condenser between the sheets of foil of opposite polarity, and the two permanent terminals 6 of the condenser. This condenser can be easily made at but small expense, because it is quite simple in its construction and all of the operations involved in its manufacture can be very conveniently performed. When finished, the condenser can be connected or disconnected at once, and ordinary handling will not effect any damage.

Figure 4 shows the mica and foil sheets separated more than is actually the case, since in practice these sheets will be in actual contact; and the condenser may be square or given any other shape desired.

The ribs 12 can, of course, extend in directions other than transversely of the condenser and it will be seen that by the use of a metallic outside cover, the amount of insulation exterior to the stack containing the mica 1 and the foil sheets 2 and 3 can be greatly reduced.

Having described my invention, what I believe to be new and desire to secure and protect by Letters Patent of the United States is:—

1. A condenser having a body comprising electrically conductive elements insulated from one another, said elements projecting from said body, means for mounting a terminal in contact with part of said projecting elements, and similar means for mounting a second terminal in contact with the remainder of said elements, and a clamping casing enveloping said body and extending substantially from end to end thereof, and engaging said terminal mounting means.

2. A condenser having a body comprising electrically conductive elements separated by insulation, said elements projecting from said body, a pair of terminals, a pair of members between which a part of said projecting elements are disposed, to be held thereby in contact with one terminal, a pair of similar members between which the remainder of said projecting elements are disposed and held thereby in contact with the other terminal, and a clamping casing encircling said body and likewise engaging the ends of all of said members to secure said members and said terminals in position with respect to said body.

3. A condenser having a body comprising elements of electrically conductive material separated by insulation, said elements projecting from said body, a pair of insulating members one of which carries a terminal to grip part of said elements, and cause them to make contact with said terminal, a pair of similar insulating members, one of which carries another terminal, to grip the remainder of said elements and cause them to make contact with the last-named terminal, said members being disposed transversely of said body, and a clamping casing encircling the body and having portions to grip the opposite ends of said members, to secure said members, said terminals and said body together.

4. A condenser having a body comprising elements of electrically conductive material separated by insulation, terminals secured to said elements, and a clamping casing of flexible material in flattened tubular form having ribs on one face extending thereover, to reenforce same.

5. A condenser having a body comprising elements of electrically conductive material separated by insulation, terminals for said condenser, and a clamping casing for said body, said casing comprising a plate extending across one face of the body and over the sides thereof with its ends bent down adjacent the opposite face, and a second plate secured against the opposite face of the body by the bent over ends of the first plate, said second plate having concave opposite edges presented to the terminals of the condenser.

6. A condenser having a body comprising elements of electrically conductive material, separated by insulation, part of said elements projecting at one point and part at another, insulating members, one of which carries a terminal, adjacent each of said points, said terminals making electrical connection with said elements thereat, said members extending transversely of the said body, and a clamping casing for said condenser, said casing comprising a plate engaging one face of the body and bent at its ends across the sides of said body and along its opposite edges over towards the opposite face of said body, and a second plate secured against the opposite face of the body by the overturned edges of the first plate, said first plate also having projections to engage the ends of said members to secure same in place with respect to said body adjacent the points where said elements project therefrom.

7. A condenser having a body including electrically conductive elements insulated from one another, said elements projecting from said body, insulating members for gripping the projecting portions of a part of said elements and securing a terminal thereto, and additional insulating members for gripping the projecting portions of the remaining elements and securing a terminal thereto.

8. A condenser having a body comprising electrically conductive elements insulated from one another, said elements projecting from said body, insulating members for gripping the projecting portions of a part of said elements and securing a terminal thereto, and additional insulating members for gripping the projecting portions of the remaining elements and securing a terminal thereto, in combination with a casing for gripping said body and said members.

9. In a condenser including conductive elements, a terminal in contact with said conductive elements, insulation to support said terminal, and a projection on said terminal to engage the insulation, in combination with a cover to maintain said contact and to keep the terminal engaged with the insulation.

10. In a condenser comprising electrically conductive elements, a terminal in contact with said conductive elements, insulation to support the said terminal, and a projection on said terminal to penetrate the insulation, in combination with a cover to maintain said contact and keep the terminal engaged with the insulation.

11. A condenser comprising electrically conductive elements projecting therefrom, a terminal in contact with said elements, and insulating clamping members gripping said elements and terminal between them.

12. A condenser comprising electrically conductive elements projecting therefrom, a terminal engaging said elements, insulating members gripping said elements and said terminal and a casing for said elements and having portions for securing said members in place.

13. A condenser comprising electrically conductive elements, a terminal in contact therewith, a covering for said elements, an insulating member within the covering and a projection on the terminal to engage said insulating member.

In testimony whereof I affix my signature.

WILLIAM DUBILIER.